United States Patent [19]

Isa et al.

[11] 4,272,418

[45] Jun. 9, 1981

[54] STABILIZER FOR VINYL CHLORIDE RESIN

[75] Inventors: Hiroshi Isa, Yachiyo; Masatoshi Takahashi, Fujisawa; Isamu Kadoya, Tokyo, all of Japan

[73] Assignee: Lion Corporation, Tokyo, Japan

[21] Appl. No.: 544,230

[22] Filed: Jan. 27, 1975

[30] Foreign Application Priority Data

Feb. 9, 1974 [JP] Japan ................................. 49/16664

[51] Int. Cl.³ ...................... C08K 5/09; C07C 53/128; C07C 51/14
[52] U.S. Cl. .................... 260/23 XA; 260/45.85 R; 260/413; 260/414
[58] Field of Search ................ 260/413, 414, 23 XA, 260/45.85 R; 252/17, 37, 400 R, 407

[56] References Cited

U.S. PATENT DOCUMENTS

| | | | |
|---|---|---|---|
| 2,075,543 | 3/1937 | Reed et al. | 260/23 XA |
| 2,831,023 | 4/1958 | Kahler et al. | 260/413 |
| 2,918,494 | 12/1959 | Closson et al. | 260/414 |
| 3,640,828 | 2/1972 | Brotz et al. | 252/35 |
| 3,661,951 | 5/1972 | Miller, Jr. et al. | 260/413 |
| 3,661,957 | 5/1972 | Shubkin | 260/413 |
| 3,676,338 | 7/1972 | Fries et al. | 260/413 |
| 3,705,852 | 12/1972 | Fisher | 260/414 |
| 3,887,508 | 6/1975 | Dieckmann | 260/45.85 |
| 3,909,472 | 9/1975 | Fischer et al. | 260/23 XA |
| 4,029,682 | 6/1977 | Foulks, Jr. | 252/413 |

*Primary Examiner*—P. E. Konopka
*Attorney, Agent, or Firm*—Blanchard, Flynn, Thiel, Boutell & Tanis

[57] ABSTRACT

A metallic salt of a fatty acid having the following formula is an excellent stabilizer for vinyl chloride resin:

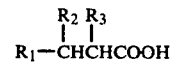

wherein two of $R_1$, $R_2$ and $R_3$ are alkyls respectively while the remaining one is alkyl or hydrogen, and the total number of carbon atoms of $R_1$, $R_2$ and $R_3$ is from 18 to 26.

6 Claims, No Drawings

STABILIZER FOR VINYL CHLORIDE RESIN

BACKGROUND OF THE INVENTION

The present invention relates to a stabilizer for vinyl chloride resin, and particularly it relates to a novel stabilizer for vinyl chloride resin which is not only superior in compatibility with vinyl chloride resin but also is capable of demonstrating a satisfactory lubricity effect and is high in safety from the viewpoint of toxicity.

Polyvinyl chloride is generally inferior in thermal stability and undergoes thermal degradation during processing thereof, so that various metallic soaps are usually added thereto as stabilizer. Among the applicable metallic soaps for this purpose, cadmium stearate demonstrates various excellent effects including, it has a satisfactory compatibility with compounds and a lubricity effect, and a resin mixed therewith is superior in workability, it imparts printability of the product, and in the case of manufacturing transparent articles, it imparts to the product a high degree of transparency, so that cadmium stearate has been commonly employed as a stabilizer for flexible and rigid vinyl chloride resins.

However, in the case of food-packaging materials or tablewares made from vinyl chloride resin containing cadmium stearate, there is a danger that the toxicant cadmium will effuse and will be taken into the human body during the use of these articles, and at the factory manufacturing cadmium stearate, there arise troubles with respect to the safety of the working personnel or environmental pollution. Therefore, there have been attempts to use calcium salt or barium salt of lauric acid or myristic acid as a substitute for cadmium stearate. However, these substitutes are all defective in that the length of the chain of the fatty acid therein is so short that the lubricity effect thereof is unsatisfactory. In this connection, when the foregoing substitutes are employed as the stabilizer, compounds are apt to adhere to the calendering roll or the embossing roll, and in an extreme case, it becomes impossible to perform calendering or embossing. Besides, the transparency of the product is deteriorated as compared with that in the case of employing cadmium stearate.

Under such circumstances, with a view to making up for the defects of the foregoing substitutes, it has also been attempted to improve the lubricity effect by jointly applying stearic acid, calcium stearate or the like. In this case, however, there arise such troubles as the printability of the product deteriorates and besides the applied stabilizer effuses onto the surface of the product. Accordingly, in this field of industry, there is a need for a novel stabilizer for vinyl chloride resin which will have an efficiency comparable with that of cadmium stearate while providing safety with respect to the toxicity.

SUMMARY OF THE INVENTION

The object of the present invention is to provide a stabilizer for vinyl chloride resins which well meets the foregoing demand. The present stabilizer for vinyl chloride resins comprises an effective ingredient consisting of metallic salt of a fatty acid having the following formula (1):

$$R_1-\underset{|}{C}H\underset{|}{C}HCOOH \quad (1)$$
$$\phantom{R_1-}R_2\phantom{H}R_3$$

wherein two of $R_1$, $R_2$ and $R_3$ are alkyl, respectively, while the remaining one is alkyl or hydrogen, and the total number of carbon atoms of $R_1$, $R_2$ and $R_3$ is from 18 to 26.

DESCRIPTION OF THE PREFERRED EMBODIMENTS

The fatty acid having the foregoing formula (1) can be synthesized in a high yield of more than 90% by employing an olefin, carbon monoxide and water as the reacting materials and effecting reaction thereof by the use of cobalt carbonyl compound, which is an industrial catalyst for the oxo reaction, together with a small amount of an organic base such as pyridine and picoline as catalyst, under the conditions of a temperature in the range of 100°–200° C. and a carbon monoxide pressure in the range of about 10–150 atmospheric pressures, and from the thus reacted mixture there can be obtained a fatty acid having said general formula (1) through distillation. In this case, it is possible to control the length of each chain of $R_1$, $R_2$ and $R_3$ in the fatty acid having the formula (1) by changing the position of the double bond and the condition for carbonylation of the material olefin. As the metallic salt of this fatty acid, calcium salt and barium salt are preferable, and these salts can be prepared, like in the case of preparing a metallic soap of straight-chain fatty acid, by either the method of fusing metal oxide or metal hydroxide with said fatty acid having the formula (1) or the method of effecting double decomposition of an alkali metal salt of said fatty acid having the formula (1) together with metal chloride, sulfate or nitrate in an aqueous solution thereof.

In the stabilizer for vinyl chloride resin according to the present invention, it is indispensable that the total number of carbon atoms of alkyl groups $R_1$, $R_2$ and $R_3$ thereof is from 18 to 26. Further, when employing metallic salts of fatty acid having said formula (1) as the stabilizer, joint use of two kinds or more of them is much more effective for improving the compatibility with vinyl chloride resin, resulting in a conspicuous improvement in transparency, printability and heat sealability of the product.

The stabilizer for vinyl chloride resins according to the present invention is superior in miscibility and compatibility with vinyl chloride resins as well as plasticizers and has an excellent lubricity effect so that the application of the present stabilizer can facilitate the kneading and processing of compounds. Besides, the present stabilizer is capable of sufficiently controlling the thermal degradation of vinyl chloride resins and never impairs the transparency and printability of the product. Moreover, in the case where the present stabilizer consists of calcium salt or barium salt, it is economically advantageous and high in safety efficiency toward the human body, so that it can be applied to even a vinyl chloride resin for use in manufacturing food-packaging materials or tablewares with no fear of toxicity.

EXAMPLE 1

After stocking a mixture having the following composition in a 1000 ml stainless steel autoclave, followed by $N_2$ substitution, reaction was effected for 8 hours under the condition of a pressure of carbon monoxide of 150 kg/cm² and a reaction temperature of 150° C.

| 2-ethyl docosene-1 | 110 g |
|---|---|
| water | 6.5 g |
| tetrahydrofuran (THF) | 100 g |
| γ-picoline | 41.3 g |
| cobalt octylate | 3.6 g |

The reaction product was subjected to topping under reduced pressure to remove water, THF and cobalt octylate therefrom and thereafter was subjected to molecular distillation, whereby there was obtained a fatty acid (I) consisting essentially of 3-ethyl tricosyl acid. Subsequently, a 1% aqueous solution of potassium salt of this fatty acid was prepared. While stirring this aqueous solution vigorously at 70° C., a 1% aqueous solution containing calcium chloride in an amount of twice as much as the stoichiometric amount was added thereto by dropping. The resulting precipitate was washed with acetone, whereby there was obtained calcium salt of β-branched fatty acid (I-Ca).

Next, a mixture having the following composition was subjected to kneading by means of a mastication roll-type molding machine and then to press-molding, whereby there was obtained transparent moldings.

| Composition of mixture: | |
|---|---|
| polyvinyl chloride (for use in injection molding) | 100 parts by weight |
| mercaptide-type organic tin | 1.5 part by weight |
| maleate-type organic tin | 0.5 part by weight |
| I-Ca | 0.2 part by weight |

The above composition was easy to knead as it never adhered to the roll at the time of the kneading, and the product moldings were of high transparency.

Besides, even after being left to stand at room temperature for 1 month, there was observed no effusion of the stabilizer onto the surface of the resin.

COMPARATIVE EXAMPLE

Varieties of polyvinyl chloride moldings were prepared in the same way as in Example 1 by replacing I-Ca in Example 1 with (a) cadmium stearate, (b) calcium stearate, (c) calcium salt of straight-chain saturated fatty acid having 20-22 carbon atoms and (d) calcium salt of β-alkyl fatty acid having 16 carbon atoms, respectively. The results were as shown in the following.

(a) cadmium stearate:
Transparent moldings with a workability equal to that in Example 1 could be obtained, and the product showed no effusion of the stabilizer onto the surface of resin even after being left standing.

(b) calcium stearate:
Though it was easy to knead, the compatibility thereof was poor, and it failed to produce moldings of high transparency.

(c) calcium salt of straight-chain saturated fatty acid having 20-22 carbon atoms:
Though it was eacy to knead like in the case of calcium stearate, the compatibility thereof was poor, and it failed to produce moldings of high transparency.

(d) calcium salt of β-alkyl fatty acid having 16 carbon atoms:
Because of poor lubricity thereof, it was difficult to knead, and the mixture adhered to the roll at the time of molding it into a film so that it was unsatisfactory from the viewpoint of workability.

EXAMPLE 2

By employing β-olefin having 20-28 carbon atoms as reactant material in lieu of 2-ethyl docosene-1 employed in Example 1 and applying the same conditions as in Example 1, a mixed fatty acid with 21-29 carbon atoms having the following composition was synthesized.

| branched fatty acid consisting essentially of α-methyl fatty acid | 45% |
|---|---|
| straight-chain fatty acid | 55% |

When calcium salt of this mixed fatty acid was prepared and used in manufacturing moldings in the same way as in Example 1, it showed a satisfactory compatibility with polyvinyl chloride as well as plasticizer at high temperature and an excellent workability. The resulting transparent product was of high transparency and showed no effusion of the stabilizer with the passage of time.

EXAMPLE 3

Calcium salt and barium salt of the mixed fatty acid having 21-29 carbon atoms synthesized in Example 2 were respectively prepared. Then, after kneading a compound having the following composition, the kneaded mixture was rolled into a 0.1 mm-thick transparent film.

| Composition of mixture: | |
|---|---|
| polyvinyl chloride (for use in injection molding) | 100 parts by weight |
| DOP | 35 parts by weight |
| DOA | 5 parts by weight |
| organic tin-type stabilizer | 2 parts by weight |
| calcium salt of branched fatty acid | 0.5 part by weight |
| barium salt of branched fatty acid | 0.5 part by weight |

A stock having the above composition was easy to knead, superior in lubricity effect, and free from adhesion to the roll at the time of the rolling work. Besides, the resulting film possessed a high degree of transparency and a satisfactory printability.

What is claimed is:

1. A stabilizer for polyvinyl chloride resin, which consists of the calcium or barium salt of fatty acid having the formula:

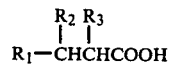

wherein $R_1$ is alkyl, one of $R_2$ and $R_3$ is methyl or ethyl and the other of $R_2$ and $R_3$ is hydrogen, and the total number of carbon atoms of $R_1$, $R_2$ and $R_3$ is in the range of from 18 to 26.

2. A stabilizer according to claim 1, which consists of a mixture of calcium and barium salts of said fatty acid.

3. A stabilizer according to claim 1, in which said fatty acid has been prepared by reacting an olefin, carbon monoxide and water, in the presence of a cobalt carbonyl compound and an organic base, at a reaction temperature of from 100° to 200° C., under a carbon monoxide pressure of from 10 to 150 atmospheres.

4. Polyvinyl chloride resin molding composition having blended therein a stabilizer in an amount effective to impart thermal stability to said composition, said stabilizer being the calcium salt, the barium salt or a mixture of the calcium and barium salts of fatty acid having the formula

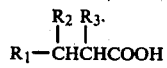

wherein $R_1$ is alkyl, one of $R_2$ and $R_3$ is methyl or ethyl and the other of $R_2$ and $R_3$ is hydrogen, and the total number of carbon atoms of $R_1$, $R_2$ and $R_3$ is in the range of from 18 to 26.

5. A polyvinyl chloride resin molding composition according to claim 4, in which said fatty acid has been prepared by reacting an olefin, carbon monoxide and water, in the presence of a cobalt carbonyl compound and an organic base, at a reaction temperature of from 100° to 200° C., under a carbon monoxide pressure of from 10 to 150 atmospheres.

6. Metal salt of alpha alkyl monocarboxylic acid having the formula:

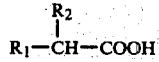

wherein $R_1$ is an alkyl group having 18 to 26 carbons when $R_2$ is methyl and $R_1$ is an alkyl group having 17 to 25 carbons when $R_2$ is ethyl and wherein the metal is selected from the group consisting of calcium and barium.

* * * * *